United States Patent
Wiechers et al.

(10) Patent No.: US 6,674,540 B1
(45) Date of Patent: Jan. 6, 2004

(54) ASSEMBLING AND PRINTING COMPOUND DOCUMENTS

(75) Inventors: Alejandro Wiechers, Jalisco (MX); Rogelio Robles, Jalisco (MX)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/317,804

(22) Filed: May 24, 1999

(51) Int. Cl.[7] .......................... G06F 15/00; G06F 17/00
(52) U.S. Cl. .................... 358/1.15; 358/1.15; 358/1.13; 358/1.14; 707/104.1
(58) Field of Search .............................. 358/1.1–1.18; 707/104.1

(56) References Cited

U.S. PATENT DOCUMENTS

| | | | |
|---|---|---|---|
| 5,181,162 A | | 1/1993 | Smith et al. .................. 364/419 |
| 5,500,715 A | | 3/1996 | Ta et al. ...................... 355/204 |
| 5,579,087 A | | 11/1996 | Salgado ....................... 355/202 |
| 5,659,676 A | * | 8/1997 | Redpath ....................... 395/777 |
| 5,835,919 A | | 11/1998 | Stern et al. .................. 707/515 |
| 5,861,958 A | * | 1/1999 | Jamrog ......................... 358/403 |
| 5,950,215 A | * | 9/1999 | Tabuchi ........................ 707/515 |
| 6,026,416 A | * | 2/2000 | Kanerva et al. ............ 707/515 |
| 6,332,149 B1 | * | 12/2001 | Warmus et al. ............. 707/517 |
| 2001/0011288 A1 | * | 8/2001 | Mastie ......................... 707/515 |
| 2002/0031144 A1 | * | 3/2002 | Friedlander et al. ....... 422/68.1 |

FOREIGN PATENT DOCUMENTS

| EP | 0814425 A2 | 6/1997 |
|---|---|---|
| EP | 0837401 A2 | 9/1997 |

* cited by examiner

*Primary Examiner*—Mark Wallerson
*Assistant Examiner*—Saeid Ebrahimi (57) ABSTRACT

A system for assembling the various pieces of a complex document that may be created in different formats and/or by different document generating application programs, while preserving the integrity of those individual file formats, and printing the fully assembled complex document. The invention may be generally characterized as (1) arranging individual document files created by different document generating application programs, MSWord®, MSExcel®, and Adobe Acrobat® for example, in different file formats (*.doc, *.xlc, *.pdf) in the order that they will appear in the compound document and then (2) launching the corresponding document generating application program to print each file in the arranged order and thereby print the compound document. In one preferred embodiment of the invention, each individual document file is printed by its respective application program to a page description language (PDL) file (rather than being sent directly to the printer), the individual PDL files are then grouped into a single print job and sent to the printer.

4 Claims, 11 Drawing Sheets

| OPTION | SUB-OPTION | VALUE |
|---|---|---|
| Properties<br>->Installed Options | 2000 Sheet Input Tray 4 | |
| | Duplex Unit<br>(for 2-sided printing) | |
| | Printer Hard Disk | |
| ->Configure Installed Options | Multi-Bin Mailbox | Job Separator Mode |

FIG. 5

| OPTION | SUB-OPTION | VALUE |
|---|---|---|
| Document Defaults ->Paper ->All Pages | Tray 1, Tray2, Tray 3, and Tray 4 | Letter |
| Document Defaults ->Destination | Place printed copies in: | Job Separator Mode (Face Down) |

FIG. 6

| OPTION | SUB-OPTION | VALUE |
|---|---|---|
| Properties | Default Paper Destination | Stacker |
| ->Output | Output Auto Continue | Overflow Job |
|  |  | Wait Forever |
|  | Overflow Output Bin | Top Output Bin |
|  | Multi-Bin Mode | Stacker |

ASSEMBLING AND PRINTING COMPOUND DOCUMENTS

FIELD OF THE INVENTION

The present invention relates generally to assembling and printing compound documents, and more particularly, assembling multiple files from different types of document generating application programs under one umbrella program and then printing those files in the desired format at the desired locations from within the umbrella program.

BACKGROUND OF THE INVENTION

Many application programs used in personal computers to generate documents generate a single specific type of file. For example, word processing programs such as MS Word® and Corel's Wordperfect® create text documents. Spreadsheet programs such as MS Excel® and Lotus 1-2-3® generate and manipulate data that is presented in a table of rows and columns. Graphics applications such as painting and drawing programs create documents in a graphical file format. Documents created by different document generating application programs in different file formats are often assembled into a single compound. A sophisticated business document, for example, might include chapters or sections of text created by a word processing program, charts created by a spreadsheet program, and pictures created in a graphics program. Sometimes, a presentation program is used to merge separate pieces of information from other programs—text from a word processing program and graphics from a drawing program for example, into a single document. Once the drawing is embedded in the word processing document, its content can no longer be manipulated. If the drawing needs to be changed, the user must call up the drawing program, retrieve the original drawing, edit the original drawing with the drawing program and then replace the drawing in the text document. Alternatively, and for longer and more complex documents, the different pieces of the document are printed separately, assembled, copied and then distributed to the end user. This is particularly true where the various pieces of the complex document are generated at diverse geographic locations.

It would be desirable to assemble the pieces of a complex document electronically, even lengthy complex documents made up of many different files and file formats, and then distribute the finished document for printing at or near the final destinations for all copies of the document. This electronic assembly before printing could minimize the need to print each piece of the document once at a single location, assemble the pieces of the document together, make copies of the finished document and then manually distribute those copies through the mail, by courier or by fax. It would also be desirable to provide this type of electronic compilation of a complex document and distributed printing under an umbrella program that preserves the underlying functionality of the individual document generating application programs to retain the ability to edit pieces of the document.

SUMMARY OF THE INVENTION

Accordingly, the present invention is directed to a system for assembling the various pieces of a compound document that may be created in different formats and/or by different document generating application programs, while preserving the integrity of those individual file formats, and printing the fully assembled compound document. The invention may be generally characterized as (1) arranging individual document files created by different document generating application programs , MSWord®, MSExcel®, and Adobe Acrobat® for example, in different file formats (*.doc, *.xlc, *.pdf) in the order that they will appear in the compound document and then (2) launching the corresponding document generating application program to print each file in the arranged order and thereby print the compound document. In one preferred embodiment of the invention, each individual document file is printed by its respective application program to a page description language (PDL) file (rather than being sent directly to the printer), the individual PDL files are then grouped into a single print job and sent to the printer.

It is expected that the invention will typically be implemented through an umbrella program (sometimes referred to as the "master" program) through which the user instructs the computer to arrange the document section files in their native format and then launch the document generating application programs (sometimes referred to as the "slave" programs) to print those files. The invention, and the umbrella program used to implement the invention, may include other features. In one embodiment, the user may insert separator pages between chapters, sections or other divisions of the document. In another embodiment, the print job is sent to the back-up printer if the first printer fails.

The invention may also include a notification system through which the user is alerted to the status of the print job, particularly any problems with the print job. Printers can now be controlled remotely at the user's personal computer through the use of a simple network management protocol (SNMP). Hewlett-Packard's JetAdmin® utility, for example, allows the user to effectively see and use the printer control panel at his or her personal computer. Using the SNMP protocol and this type of remote control feature, the user's computer can monitor the status of the printer. If the printer encounters a problem, it generates an error message. This error message is received at the user's personal computer. The error message may be displayed visually, audibly or it may prompt a call to the user's pager to alert the user to the problem.

In another embodiment of the invention, the user may view the compound document at any time during the process of arranging its contents. In this embodiment of the invention, the individual document files, separator files and the like are converted to a portable document file (PDF) format and made available for viewing through, for example, the print preview function. In this way, the user can readily visualize the overall document to ensure has been arranged properly before the document is sent to the printer.

The document assembly and printing system of the present invention allows a user to print and collate in one operation as many copies of a complex document that are needed, and to print those documents at any desired location. The print job may be left unattended for long periods of time, overnight for example, as long as the printer has an adequate supply of paper and color paper or other media may be used to separate chapters, sections or other parts of the document. The invented system also allows the entire print job, if desired, to be handled by one person using a computer dedicated to complex document assembly and printing with a single printer or group of printers at various distribution sites.

These and other features of the invention may be better understood from the drawings and the following detailed description of several exemplary embodiments of the invention.

DETAILED DESCRIPTION OF THE INVENTION

The preferred embodiments of the invention disclosed herein function using a programmable IBM® compatible high speed Pentium® personal computer running a Windows® 95, 98 or Windows® NT 4.0 operating system. In general, however, the invention may also be embodied in and implemented on any computer system having comparable processing and user interface capabilities. Some of the features of the invention are incorporated into software commercially available from Hewlett-Packard Company under the name ProposalJet®. The ProposalJet® software runs on a personal computer using a Pentium® 166 Megahertz or higher speed processor. To take full advantage of the ProposalJet® software, the computer should have 48 megabytes of available RAM and 3 gigabytes of hard disk space, a network card with TCP/IP drivers and an available parallel port (LPT). The ProposalJet® software is used in conjunction with Hewlett-Packard's 8000 Series LaserJet® printers. The invention may be embodied in any other similar types of computer/printing systems that offer the requisite processing and paper handling capabilities.

Figure 1:
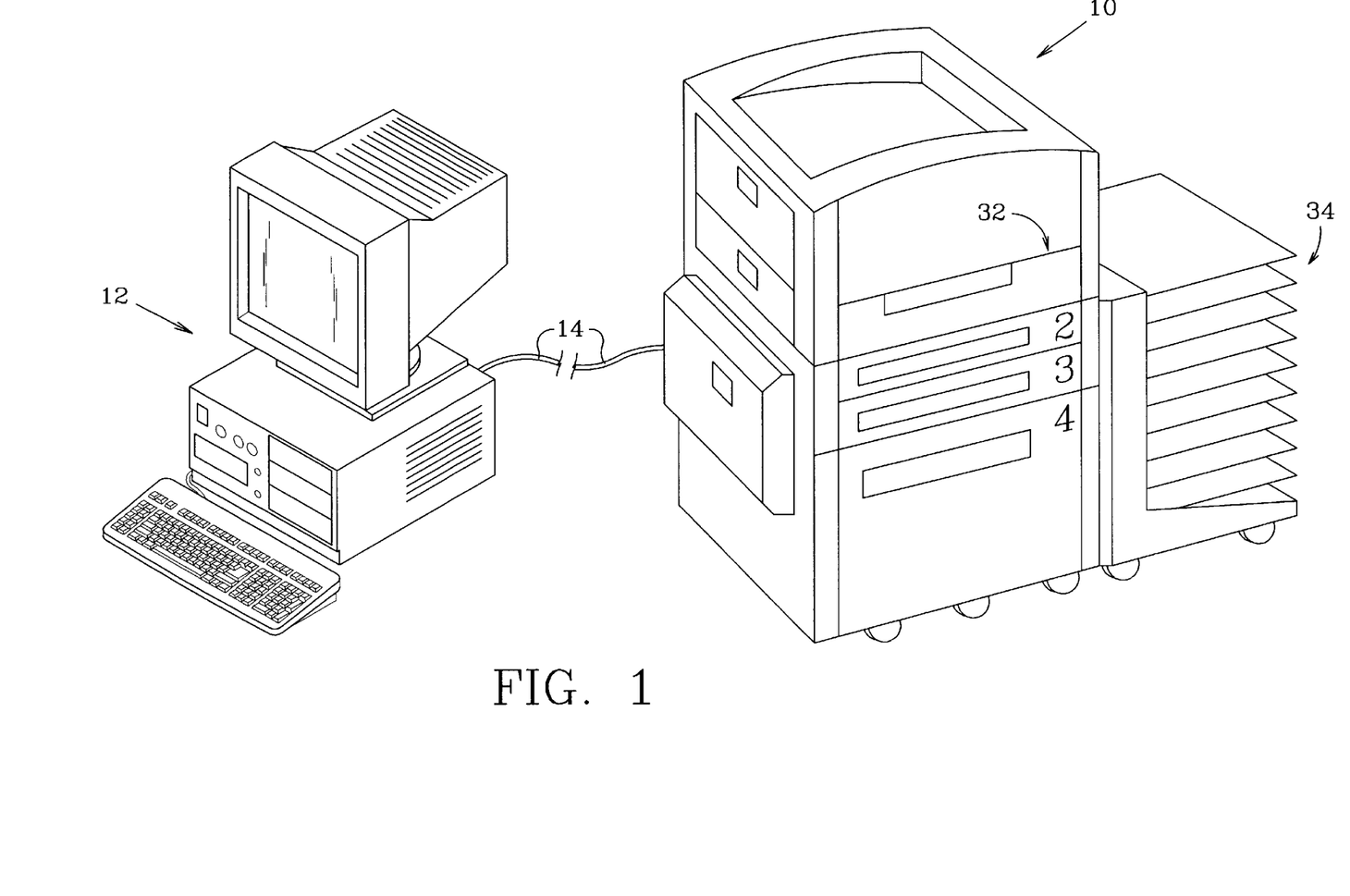
FIG. 1 is an idealized perspective representation of a computer/printer system that may be used to implement the document assembly and printing techniques of the present invention.
Figure 2:
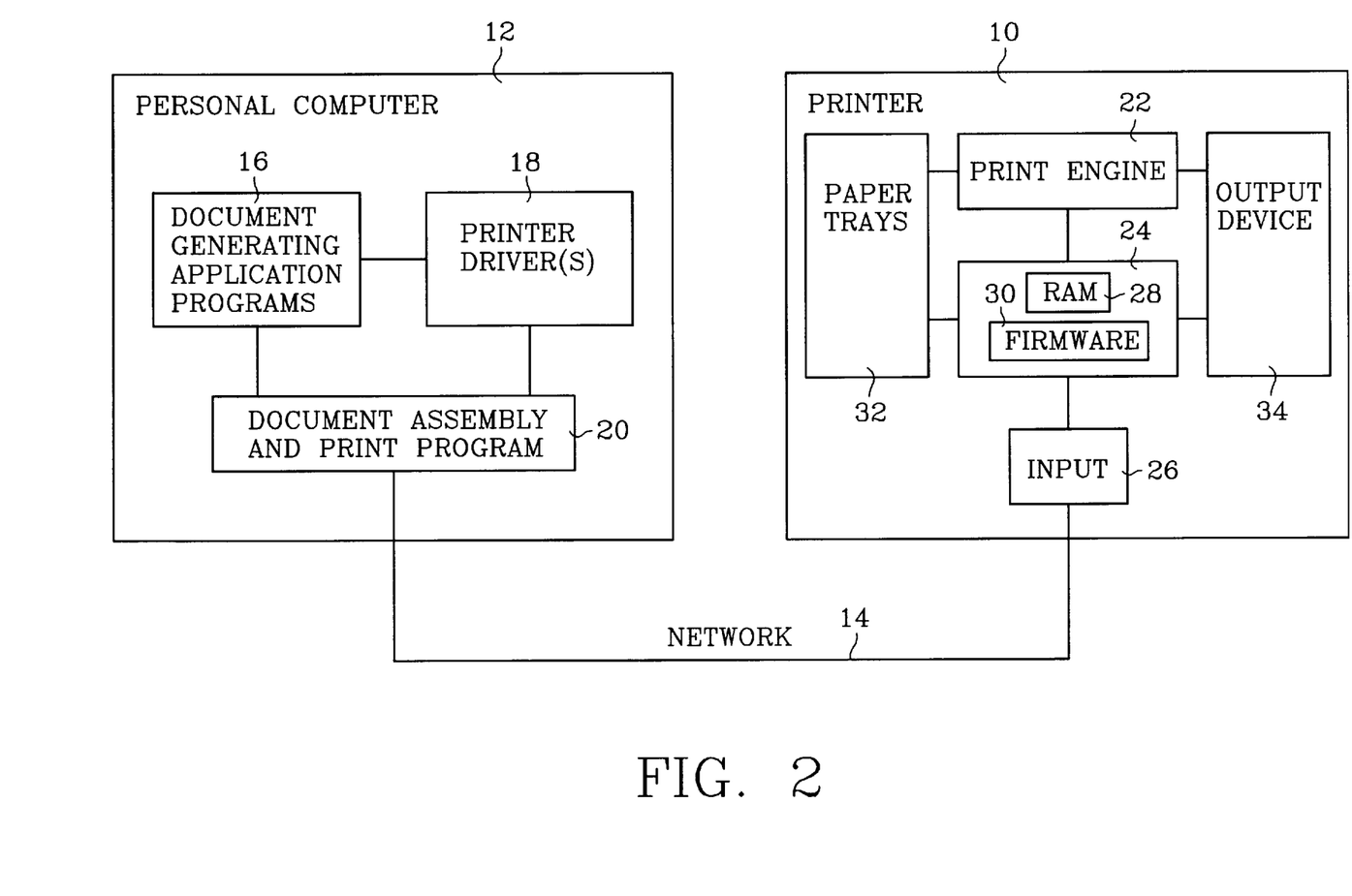
FIG. 2 is a block diagram of the basic components of the computer/system illustrated in FIG. 1.

Referring now to FIGS. 1 and 2, a printer 10 is connected to a personal computer 12 through a network 14. The basic components of printer 10 and computer 12 are shown schematically in FIG. 2. The connection between computer 12 and printer 10 may be a direct connection using a cable such as that shown in FIG. 1, a wireless or remote connection via a telecommunication link, an infrared link or a radio frequency link, or any other connector or system that establishes communication between printer 10 and computer 12. Although the invention may be used with a printer server or other intermediate facilities between computer 12 and printer 10, a direct connection between computer 12 and printer 10 is preferred.

Computer 12 has document generating application programs 16, printer drivers 18, and document assembly and print program 20. The invention is implemented through document assembly and print program 20. The presently available commercial embodiment of document assembly and print program 20 is Hewlett-Packard's ProposalJet® software. Printer 10 has a print engine 22 connected to a controller/formatter 24 which receives data to be printed from input 26. Input 26 represents generally, for example, a parallel input/output (PIO) port or channel, a serial input/output (SIO) port or channel, an enhanced input/output (EIO) port or channel an remote and wireless couples. Controller 24 includes electronics connecting controller 24 to the inputs, processing electronics, random access memory (RAM) 28, firmware 30 and associated electronics connecting controller 24 to print engine 22. Printer 10 also includes multiple paper trays 32 and an output device 34. The Hewlett-Packard LaserJet® 8500 color printer, for example, includes four input paper trays and eight output trays or bins as they are often called. Output device 34 may include, in addition to the multiple output bins, finishing and binding devices.

Figure 3:
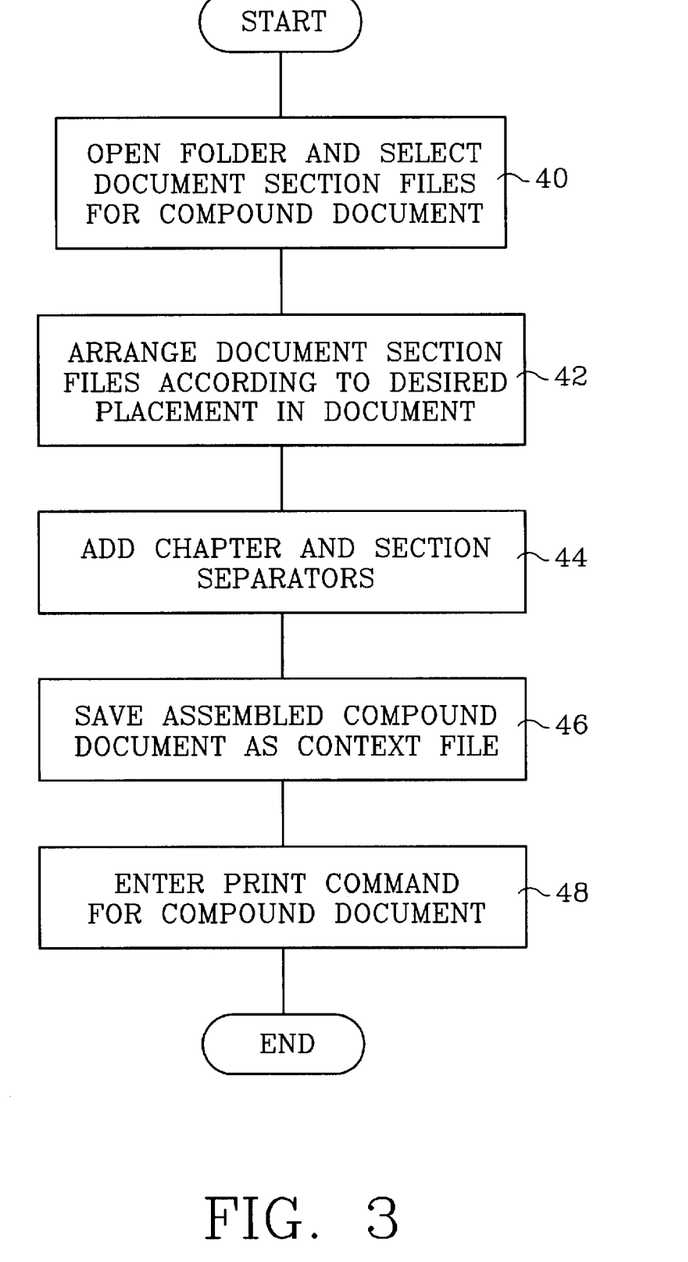
FIGS. 3 and 4 are flow charts showing the sequence of steps for document assembly and printing according to one embodiment of the invention.
Figure 9:
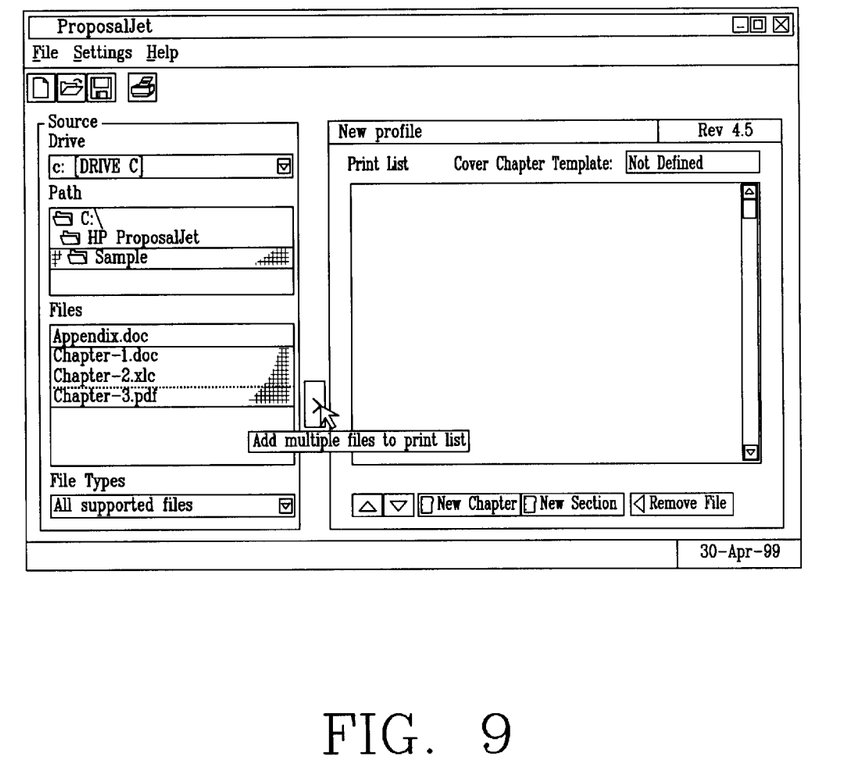
FIGS. 9–13 are a series of sequential computer screen displays showing the selection and assembly of the individual document files and separators used to form the compound document.
Figure 10:
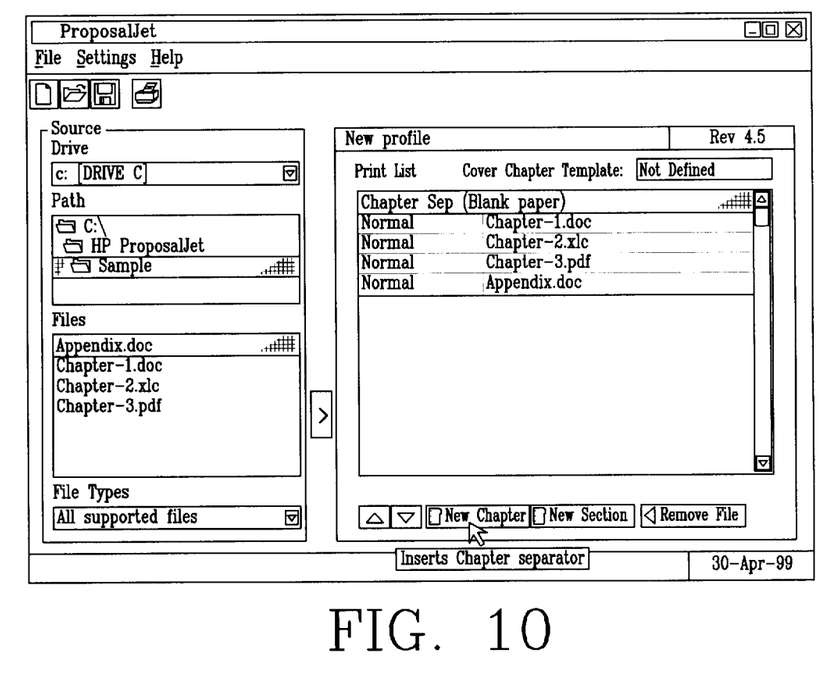

Referring to the flow chart of FIG. 3, once individual document files have been saved to a common folder, assembly of the compound document begins by opening the folder (folders are also commonly referred to as directories) and selecting those files that will be combined to form the compound document (step 40). FIG. 9 illustrates a computer screen display presented to the user in ProposalJet® to select the files in step 40 of FIG. 3. Referring to FIG. 9, the folder containing the individual document files has been named "Sample" within the HP_ProposalJet folder. Three files have been stored in the Sample folder—Chapter1.doc (a MSWord® file), Chapter2.xlc (a MSExcel chart file), and Chapter3.pdf (an Adobe Acrobats portable document file). The files that will be included in the compound document are selected by clicking on the file name to highlight the name and then clicking the > button. The selected file is then inserted as a row item in the New Profile box print list on the right side of the screen, as shown in FIG. 10.

Figure 11:
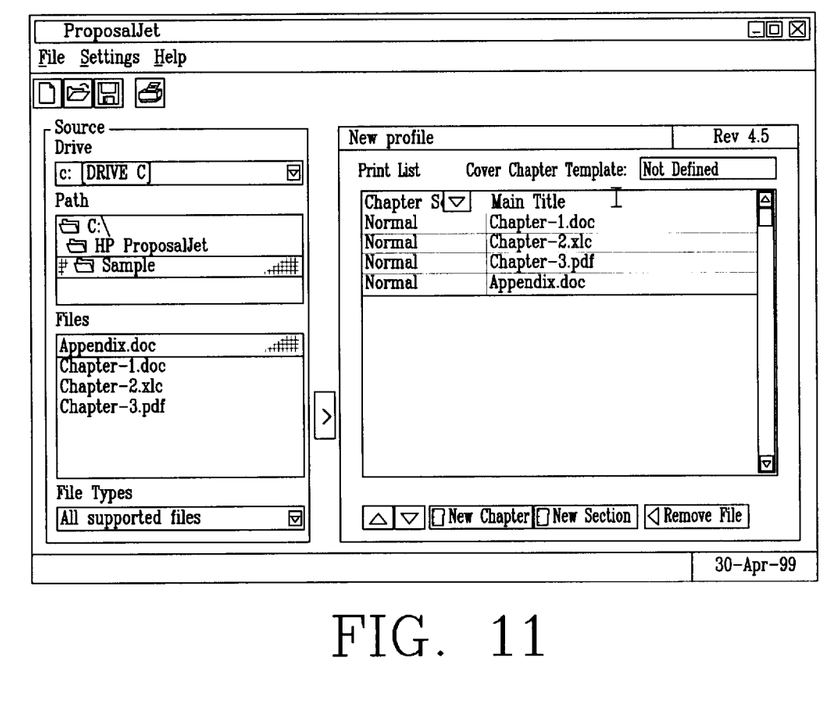
Figure 12:
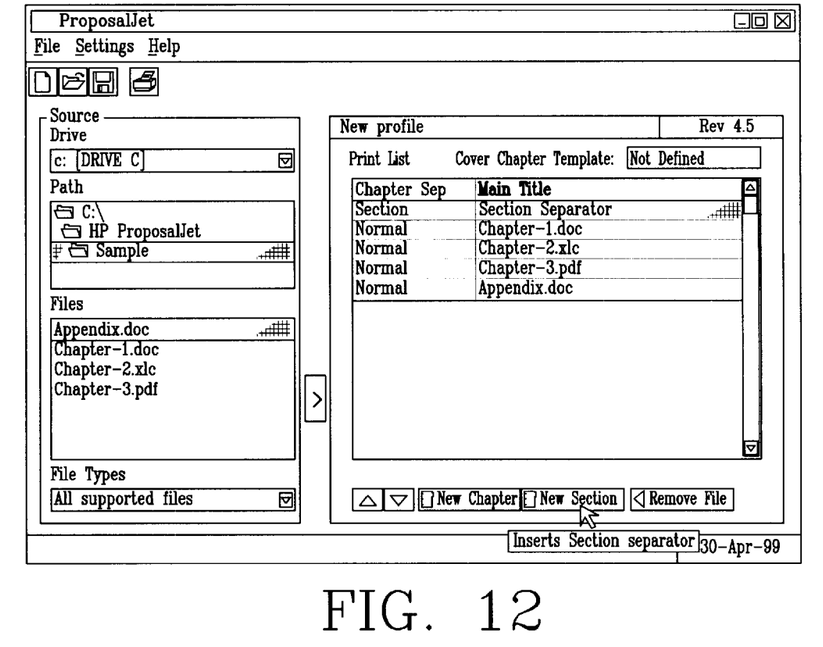

The individual document files are arranged as rows in the print list according to their desired order in the compound document (step 42 in FIG. 3). Then, chapter and section separator pages, or some other type of separator, are inserted where desired to separate the different sections of the compound document (step 44). FIGS. 10 and 11 illustrate the computer screen displays as the user adds chapter and section separators. In FIG. 10, the individual documents (Chapters 1, 2 and 3) have been selected and arranged according to their order of appearance in the compound document. The Chapter 1, 2 and 3 files are identified in the print list as "normal" files. Normal files generally will be assigned by default to print on paper from the high capacity paper tray. Chapter cover sheets, section separator pages or other separators may be inserted at any point on the print list as special files assigned to print from any other paper trays that may be available on the printer. In the embodiment of the invention illustrated in FIGS. 9–13, three different types of separator pages may be selected—a blank chapter cover sheet, a chapter cover sheet with text or a section separator. A separator page is inserted by selecting the file on the print list on which the separator will be placed and clicking the New Chapter or New Section button. The chapter cover sheet separators may be left blank or a title may be added as seen by comparing FIGS. 10 and 11. In FIG. 10, the Chapter 1 cover sheet separator page will be blank. In FIG. 11, the Chapter 1 chapter cover sheet will be printed with "Main Title." FIG. 12 shows the insertion of a section separator page after the Main Title chapter cover sheet and before the Chapter 1 MSWord® document.

Each separator file is inserted into the print list as a blank MSWord® or other word processing file. A PJL command is inserted later to tell the printer which paper tray to use according to the printer configuration. For example, in the Hewlett-Packard ProposalJet® software used with Hewlett-Packard 8000 series LaserJet® printers, chapter cover sheets are automatically assigned to Tray 2 and section separator sheets are automatically assigned to Tray 3. Therefore, for each print list row item in which a chapter cover sheet is assigned, a PJL command is entered directing the printer to take paper from Tray 2. When a section separator sheet is selected, the printer is directed to take paper from Tray 3. The user can then select the type and color of the paper or other sheet media for the separator pages by inserting the desired paper in Tray 2 for chapter cover sheets and in Tray 3 for the section separator pages.

If text is desired for the separator page, the text is inserted into the otherwise blank MSWord® file.

Figure 13:
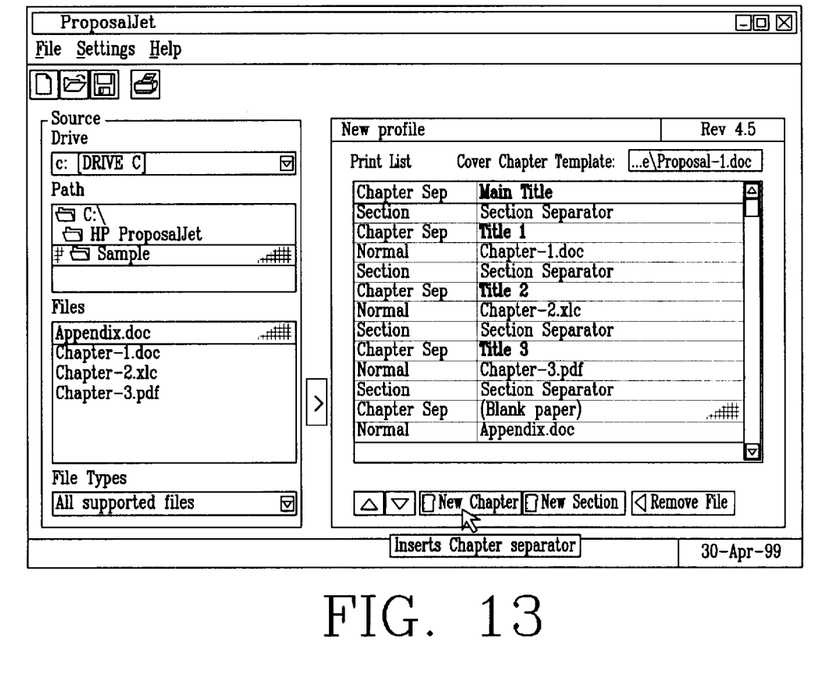

Any file or item in the print list may be relocated up or down the print list by dragging it with the mouse pointer or by selecting it and clicking the up or down buttons. Any file may be removed from the print list by selecting it and then clicking the Remove File button. Once all of the individual document files and separators are selected and arranged in the desired order in the print list, as shown in FIG. 13, the files, the print list and its configuration may be saved into a "context" file as indicated in optional step 46 in FIG. 3. In ProposalJet®, this context file is called a Profile and given the extension *.pmk. The context file is a configuration file that contains the name of the files to print, any separator page titles and the order/positions of the files. Once the files in the print list are properly arranged and, if desired, saved as a context file, the user then enters the print command (step 48). In another optional feature of the invention, the files arranged in the print are converted to a portable document format (PDF) and displayed to the user. In this way, the user can preview the fully assembled document to make sure everything looks good before entering the print command.

Figure 4:
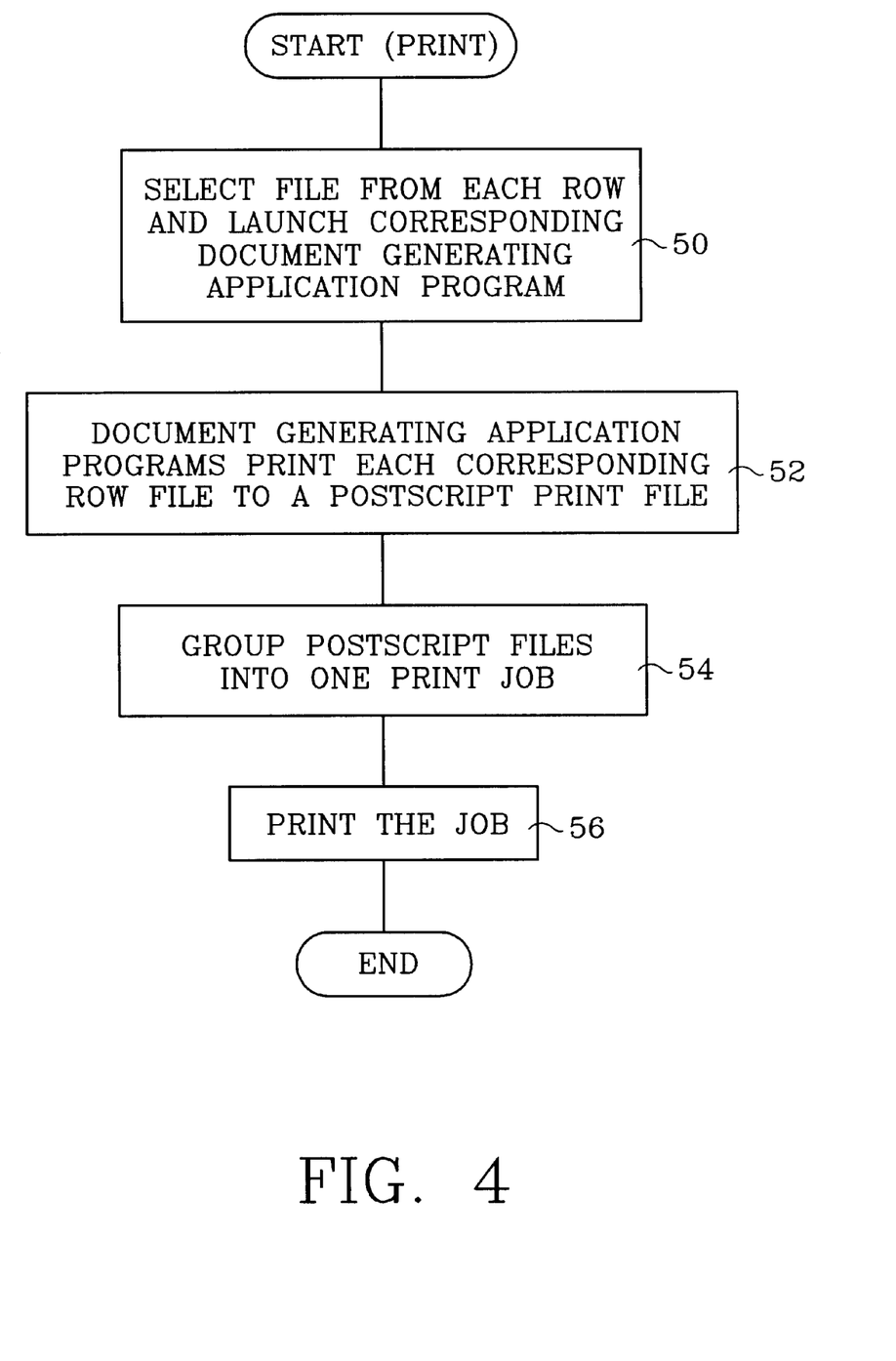

The compound document is printed according the steps indicated in the flow chart of FIG. 4. Referring to FIG. 4, upon entry of the print command, the file in each row of the print list is selected in sequence from the first row to the last row, the corresponding document generating application program is launched (step 50) and directed to print its file to a Postscript® file or other suitable page description language (PDL) file(step 52). For example, in the print list of FIG. 13, MSWord® is launched to print to a Postscript® file for the Main Title chapter cover sheet (row 1), section separator page (row 2), Title 1 chapter cover sheet (row 3), Chapter-1 document (row 4), section separator page (row 5), and Title 2 chapter cover sheet (row 6). Then, MSExcel® is launched to print the *.xlc format Chapter-2 document, and so on until each row has been printed to a Postscripts file. It is desirable to load all of the document generating application programs on the computer running ProposalJet® (or any software embodying the invention) so that computer can efficiently launch those programs.

The individual PDL files are then grouped into a single print job (step 54). In the preferred embodiment, this grouping is achieved by stripping from the first PDL print file in the print list the information that identifies that file to the printer as a unique print job, adding the appropriate paper tray instructions to the file, and then the file is sent to the printer (step 56). These steps are repeated for each file in the print list until all of the files have been printed.

Figure 5:
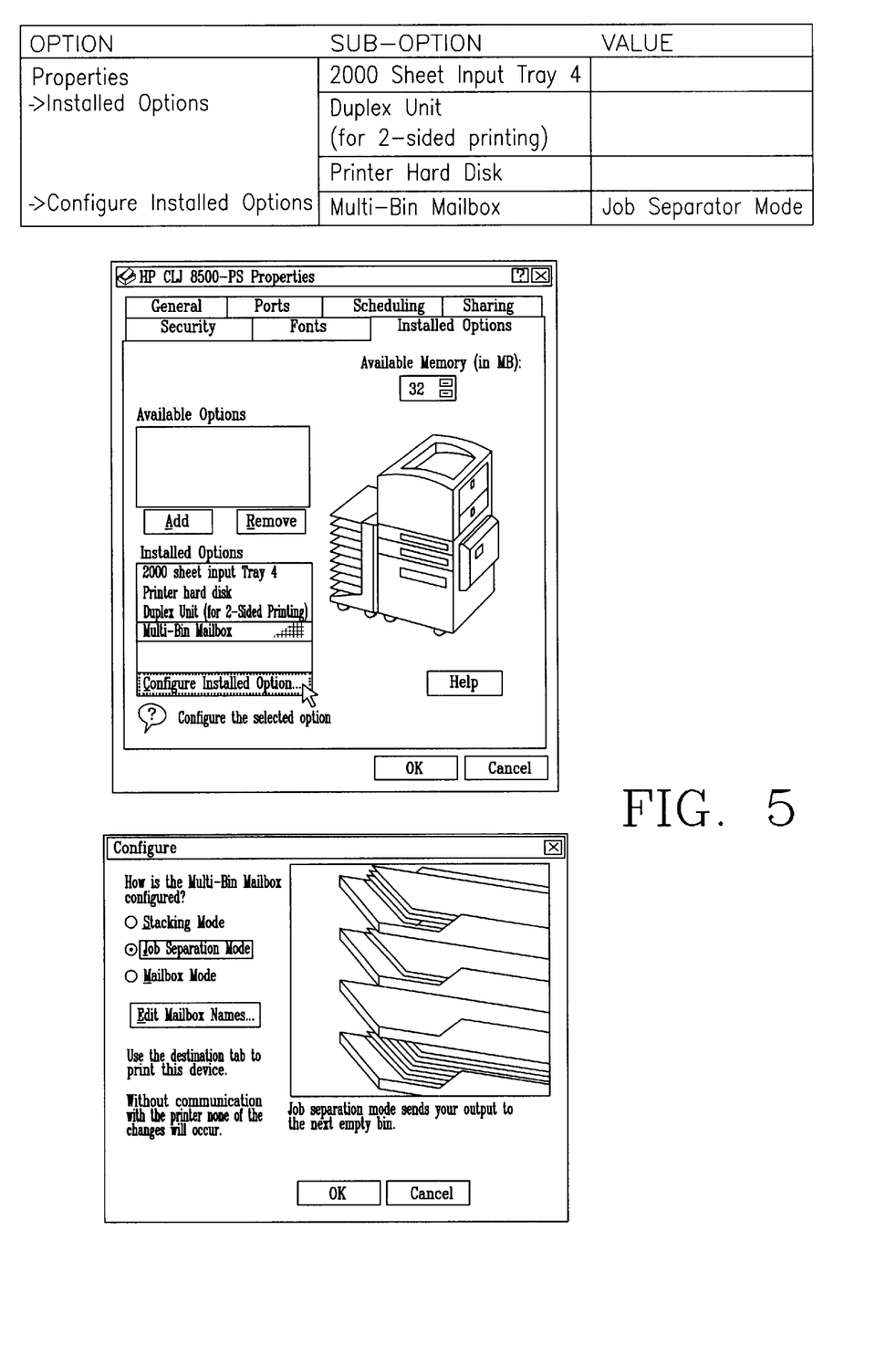
FIGS. 5 and 6 show the printer configuration and the computer screen display for configuration of an Hewlett-Packard LaserJet® 8500 printer used to print a document assembled according to one embodiment of the invention.
Figure 6:
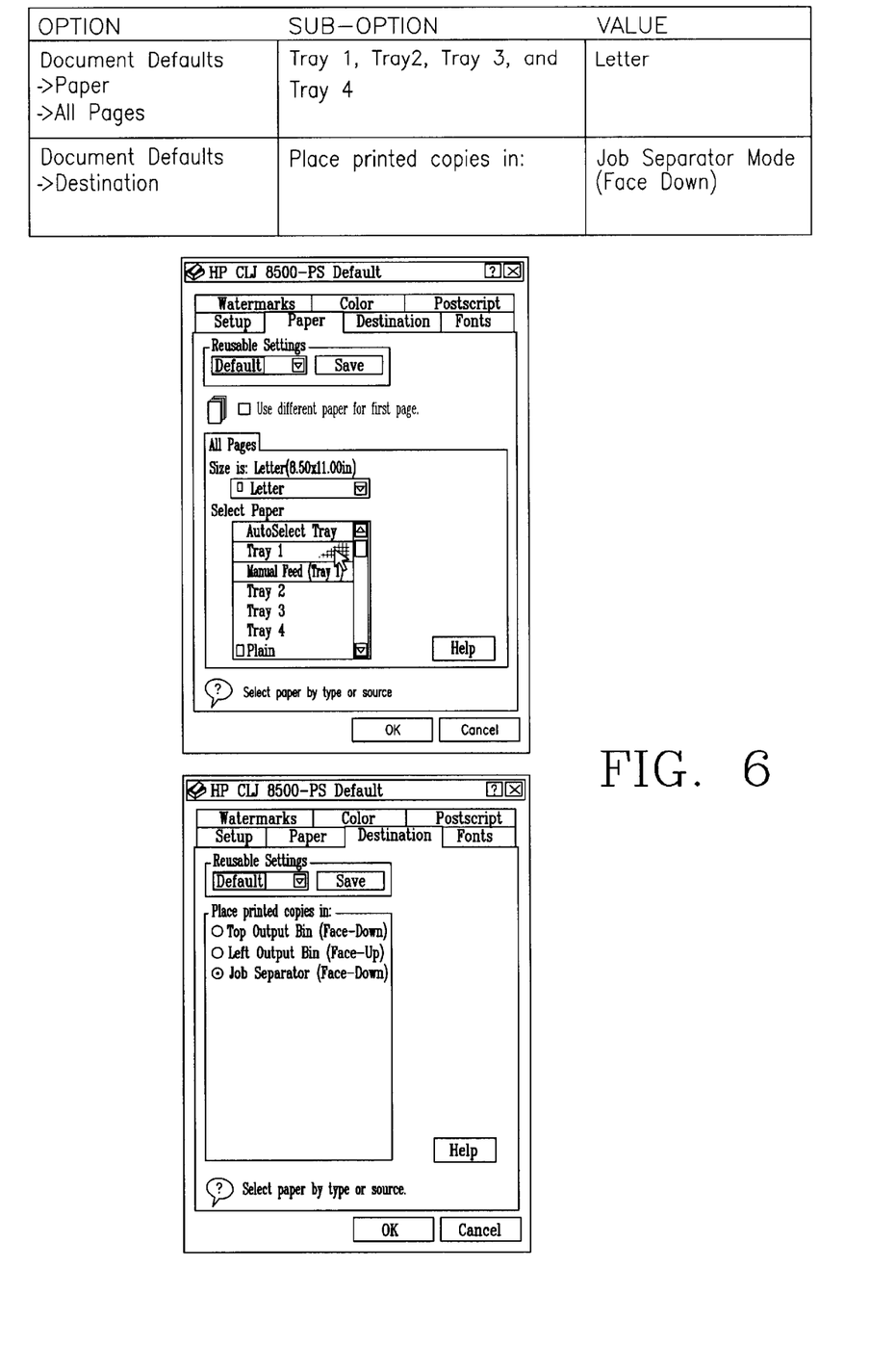
Figure 7:
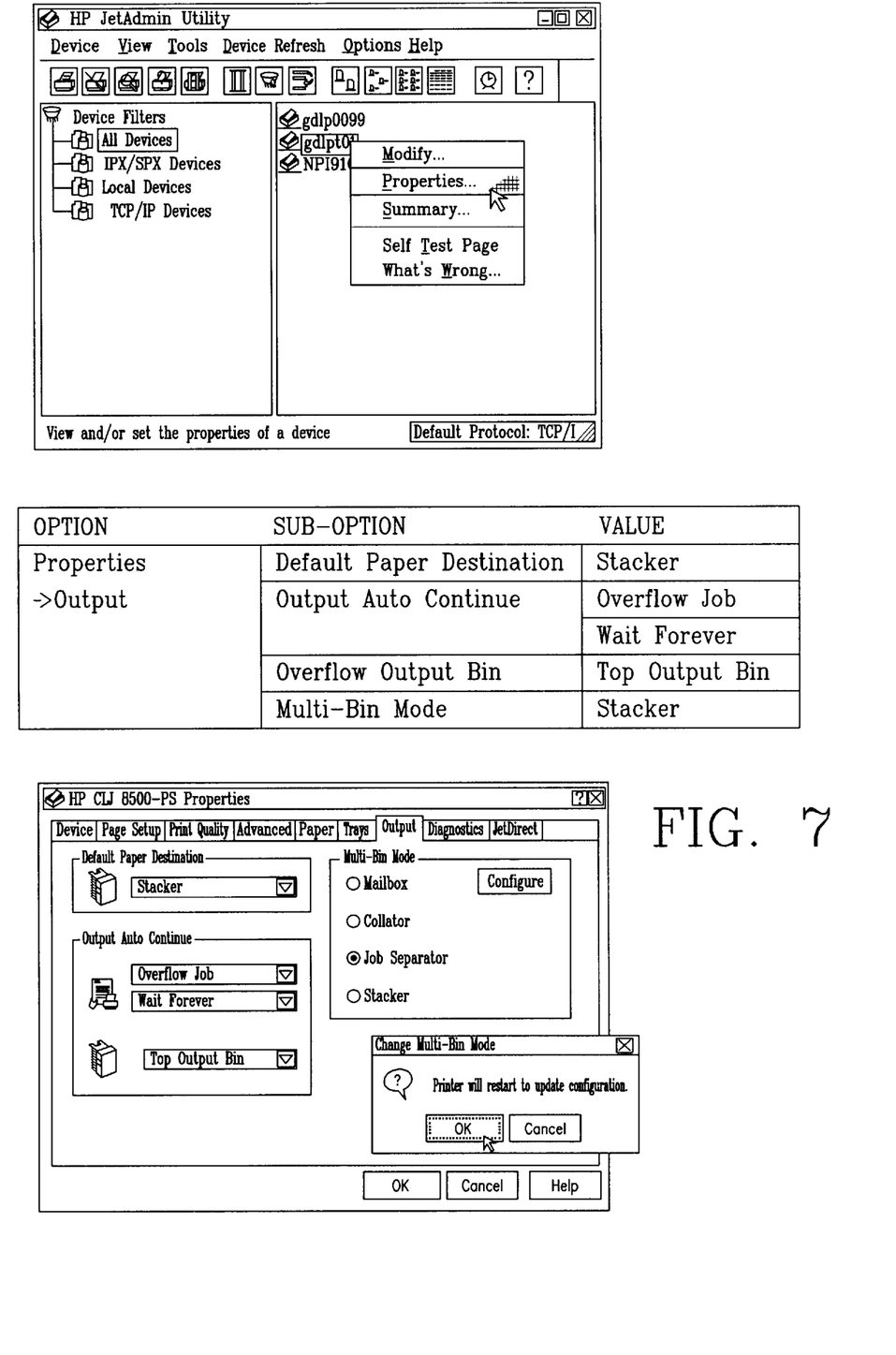
FIG. 7 shows the computer screen display for the output device configuration using the Hewlett-Packard JetAdmin® utility.
Figure 8:
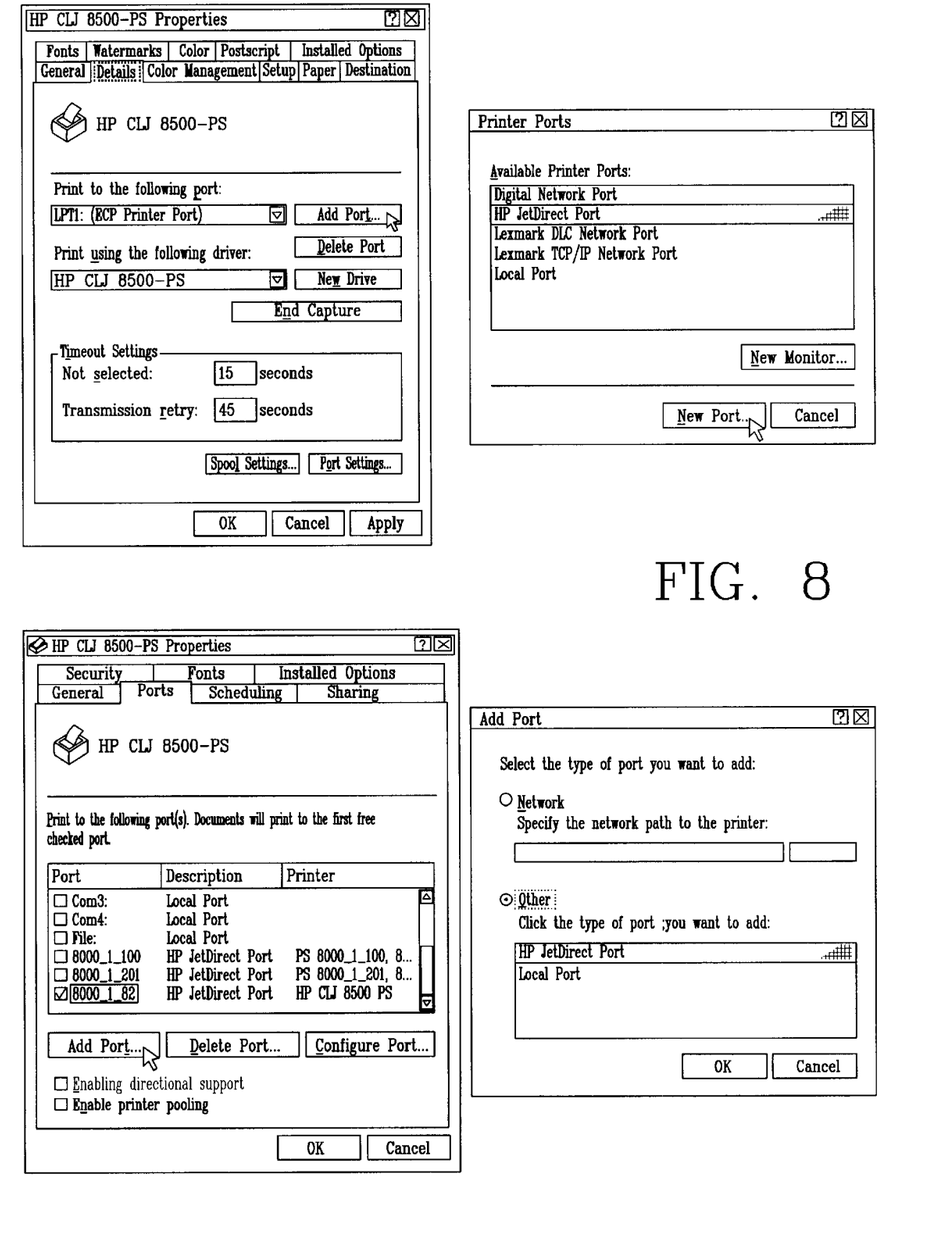
FIG. 8 shows the port installation to establish bi-directional communication and the computer screen display for the port configuration.

A typical ProposalJet® configuration for a Hewlett Packard LaserJet® 8500 printer operating in a Windows NT® environment is illustrated in FIGS. 5–7. In FIGS. 5 and 6, the multi-bin mailbox output device, paper size and destination properties are set through the printer driver. In FIG. 7, additional properties for the multi-bin mailbox output device may be set using Hewlett Packard's JetAdmin® utility. The particular features available on any particular printer are not part of the invention. The printer configuration of the LaserJet® 8500 in FIGS. 5–7 is given simply to illustrate one example of a printer and printer configuration that might be used with the invention to print a complex business document.

Printers can now be configured remotely at the user's personal computer through the use of an simple network management protocol (SNMP) and bi-directional communications between printers and printer clients. Hewlett-Packard's JetAdmin® utility allows the user to effectively see and use the printer control panel at his or her personal computer. The invention includes several additional optional features that take advantage of this remote control technology. To help provide reliable unattended printing of the compound document, the status of the printer is monitored by and displayed at the user's computer. The user is alerted to any problems with the print job by, for example, displaying the error message(s) generated by the printer and issuing an audible alarm or paging the user (by phone, beeper or the like), or both, in response to the receipt of an error message. According to another feature of the invention, the user is allowed to send the print job to an alternate/back-up printer in response to a print failure or in response any other error message from the printer. The print job could also be sent automatically to an alternate "back-up" printer in response to an error message from the printer.

The present invention has been shown and described with reference to the foregoing exemplary embodiments. It is to be understood, however, that other forms, details, and embodiments may be made without departing from the spirit and scope of the invention which is defined in the following claims.

What is claimed is:

1. A computer program product for assembling and printing a compound document from individual document files created by different document generating programs in different file formats, the product comprising a computer-usable medium having computer-readable instructions thereon for:

allowing a computer user to arrange the individual document files in the order in which the documents they represent will appear in the compound document;

launching the document generating program corresponding to each file;

causing each document generating program to print the file or files corresponding to that program in the arranged order to a print file;

grouping the print files into a single print job;

sequentially for each file, stripping from the page description language file information that identifies the file to the printer as a unique print job, adding the appropriate paper tray instructions to the file; and then sending the file to the printer.

2. A computer program product for assembling and printing a compound document from individual document files created by different document generating programs in different file formats, the product comprising a computer-usable medium having computer-readable instructions thereon for:

allowing a computer user to arrange the individual document files in the order in which the documents they represent will appear in the compound document;

launching the document generating program corresponding to each file;

causing each document generating program to print the file or files corresponding to that program to a page description language file; and grouping the page description language files into a single print job;

sequentially for each file, stripping from the page description language file information that identifies the file to the printer as a unique print job, adding the appropriate paper tray instructions to the file; and then sending the file to the printer.

3. A computer program product for assembling and printing a compound document from individual document files created by different document generating programs in different file formats, the product comprising a computer-usable medium having computer-readable instructions thereon for:

allowing a computer user to arrange the individual document files in the order in which the documents they represent will appear in the compound document;

launching the document generating program corresponding to each file;

causing each document generating program to print the file or files corresponding to that program in the arranged order to a page description language file; and sequentially for each file, stripping from the page description language file information that identifies the file to the printer as a unique print job and then sending the file to the printer.

4. A method for assembling and printing a compound document from individual document files created by different document generating programs in different file formats, the method comprising:

allowing a computer user to arrange the individual document files in the order in which the documents they represent will appear in the compound document;

launching the document generating program corresponding to each file;

causing each document generating program to print the file or files corresponding to that program in the arranged order to a page description language file; and sequentially for each file, stripping from the page description language file information that identifies the file to the printer as a unique print job and then sending the file to the printer.

* * * * *